UNITED STATES PATENT OFFICE.

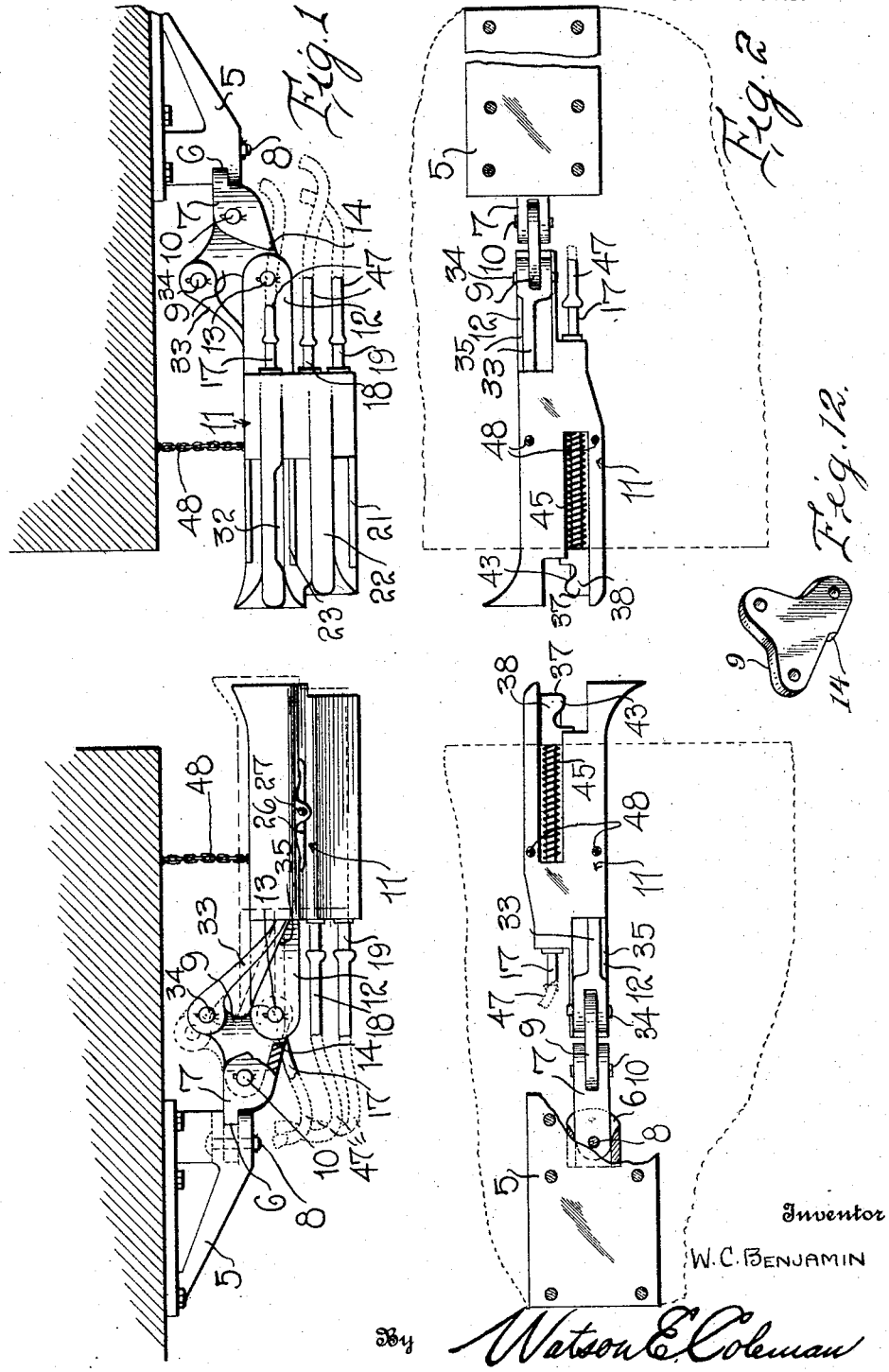

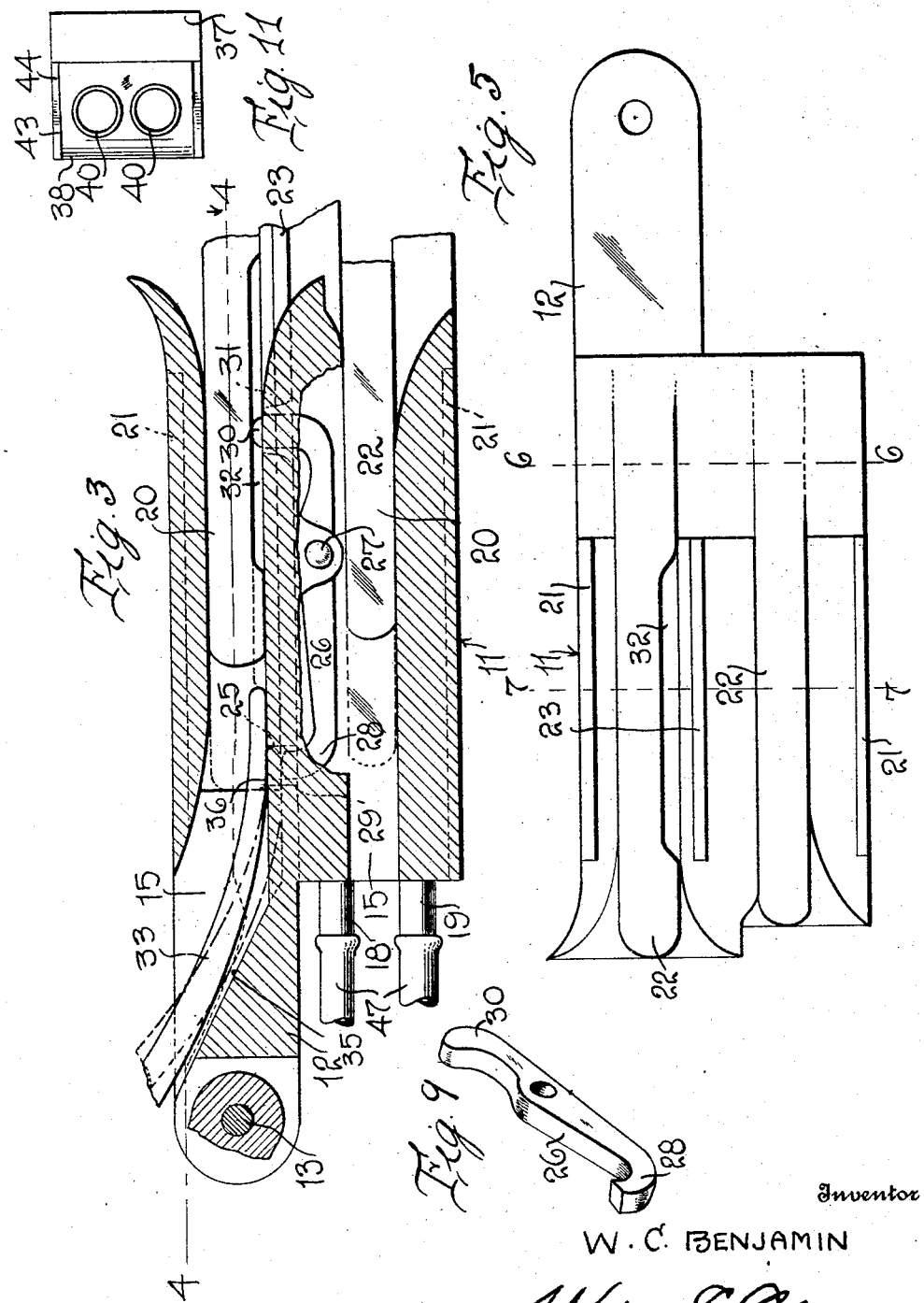

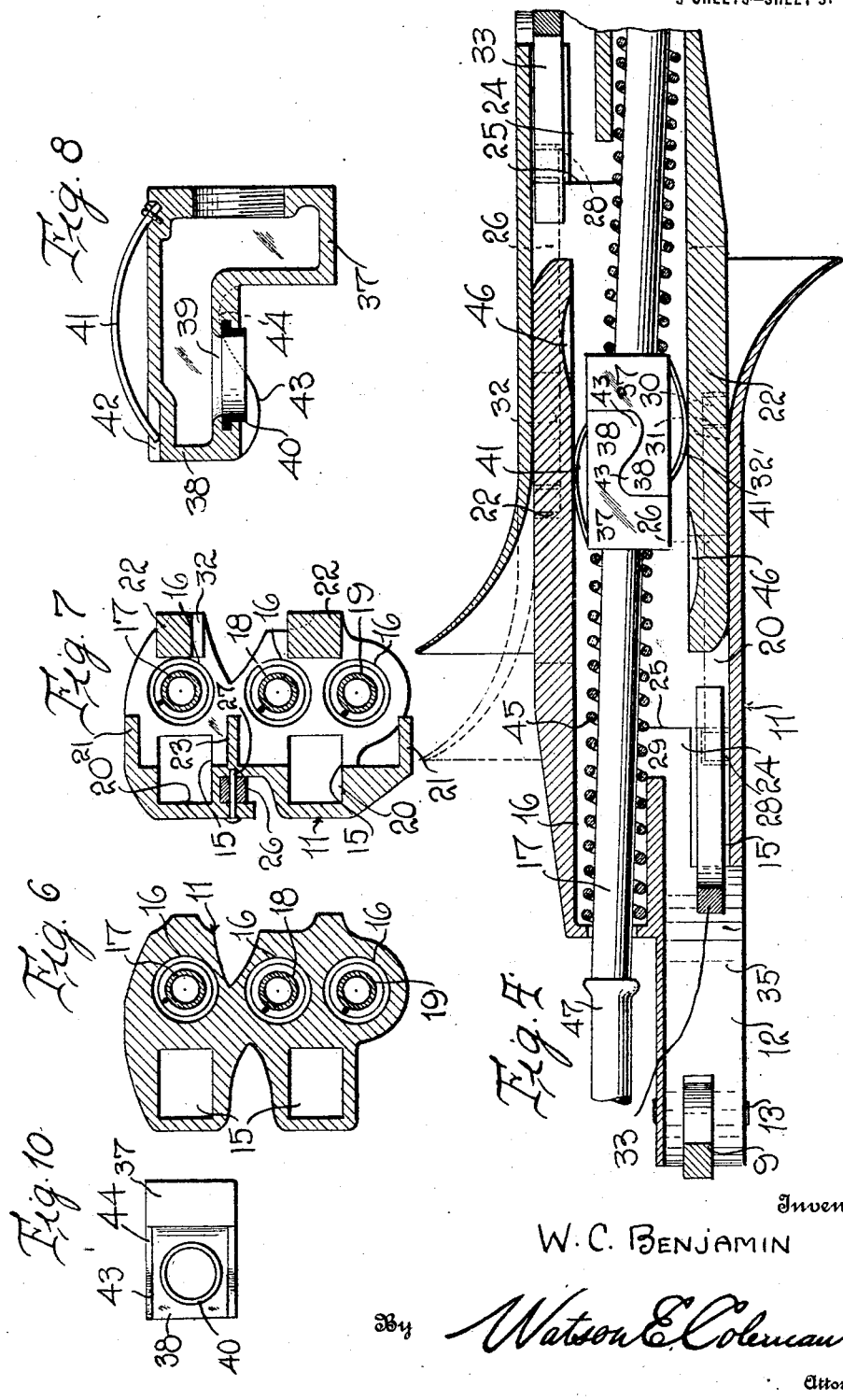

WARREN C. BENJAMIN, OF SPENCER, NEW YORK.

AIR-BRAKE COUPLING.

1,186,068.  Specification of Letters Patent.  Patented June 6, 1916.

Application filed October 30, 1915. Serial No. 58,889.

*To all whom it may concern:*

Be it known that I, WARREN C. BENJAMIN, a citizen of the United States, residing at Spencer, in the county of Tioga and State of New York, have invented certain new and useful Improvements in Air-Brake Couplings, of which the following is a specification, reference being had to the accompanying drawings.

This invention relates to an improved air brake coupling and has for its primary object to provide means for coupling together the ends of the train line pipes on freight cars or passenger coaches, said means having a maximum flexibility of movement so that all liability of the pipes becoming accidentally uncoupled in the swaying of the cars, will be obviated.

It is another and more particular object of the invention to provide in an apparatus of the above character, coupling members suspended from the ends of the cars and entirely unconnected with the draw bars, means for raising or elevating each of the coupling members, each of said members including means for actuating the raising means for the other coupling member when the members are coupled together so that said members mutually act to support each other independently of the flexible suspension elements.

The invention has for another important object to provide the coupling members each having fingers for interlocking engagement with an opposed coupling member, means mounted upon the under side of the car to which the coupling member is connected, whereby said member may swing laterally and vertically with respect to the car body, chains connected to the car and to the coupling members to limit their downward swinging movement, and means connected to one of the movable supporting elements for the coupling member adapted for engagement by one of the fingers on an opposed coupling member whereby the supporting element is actuated and the coupling member lifted to slacken the suspending chain.

It is another object of the invention to provide improved means for releasing the coupler elevating means when the coupling members are disconnected.

It is a further general object of my invention to improve and simplify the construction of pipe line couplers and render the same positive in action and reliable and efficient in use and also reduce the back pressure upon the cars to a minimum while, at the same time, a secure fluid-tight connection between the pipe line sections is obtained.

With the above and other objects in view, my invention consists in the novel features of construction, combination and arrangement of parts to be hereinafter more fully described, claimed and illustrated in the accompanying drawings, in which, Figure 1 is a side elevation illustrating the preferred embodiment of my improved air brake coupler and showing one of the coupling members in dotted lines in raised position; Fig. 2 is a top plan view thereof; Fig. 3 is a vertical section through the coupling members, showing the positions of the fingers of one member with respect to the other coupling member in the act of coupling two members together, and also indicating in dotted lines the manner in which the elevating means for the coupling member is actuated by one of the fingers; Fig. 4 is a section taken on the line 4—4 of Fig. 3; Fig. 5 is an enlarged side elevation of one of the coupling members; Fig. 6 is a section taken on the line 6—6 of Fig. 5; Fig. 7 is a similar view taken on the line 7—7 of Fig. 5; Fig. 8 is an enlarged sectional view of one of the coupling heads viewed from the bottom; Fig. 9 is a detail perspective view of the trip dog; Fig. 10 is a side elevation of one of the single coupling heads; Fig. 11 is a similar view of the double coupling head. Fig. 12 is a detail perspective view of one of the parts.

The mounting and construction of the coupling members which are arranged upon the opposite ends of each car or coach, is identical, and in the following description, I shall, therefore, refer to only one of the coupling members and specifically describe the detail construction thereof.

A bracket member 5 is suitably secured to the draft sills or any other stationary part of the car frame. This bracket member is bifurcated, as at 6, to receive an apertured lug or extension formed upon one end of a swivel block 7. A pivot bolt 8 extends through this lug and through coinciding openings in the bracket member 5. Thus, the block 7 is free to swing or turn horizontally in a lateral direction. The end face of the block 7 which is opposed to the bracket 5, is concave and the bracket member is rounded or convex so that there will be no impediment to the free turning movement of the swivel block. This block 7 is also bifurcated and, in the same, the substantially triangular-shape member 9 is pivoted for vertical movement upon the transverse bolt or pin 10. The particular purpose and function of this member 9 will be hereinafter pointed out.

The coupling member consists of a body 11 which is in the form of a single integral casting and is provided upon one end with a longitudinally projecting arm 12. This arm is connected by means of the pivot pin 13 to one arm of the triangular member 9, and this arm of the member is formed on its lower edge with a shoulder 14 for abutting engagement against the forward end of the swivel block 7.

The end of the coupler body 11, upon which the projecting arm 12 is formed, is of the cross-sectional configuration shown in Fig. 6, wherein it will be observed that the same is provided with the upper and lower spaced longitudinally extending rectangular openings 15, and at one side of these openings, the coupler body is also formed with three vertically alined circular openings 16. Through the uppermost opening 16, the air brake pipe 17 is loosely disposed, and when the coupler is employed upon passenger coaches, the other opening 16 receives the air line signal pipe 18 and the steam heating pipe 19 respectively. Of course, when used upon freight trains wherein the latter pipes are not employed, only the uppermost opening 16 of the coupler will be provided, the lower portion of the coupler being omitted. With the freight equipment, where only the upper portion of the coupling member having the single opening 16 to receive the air line pipe is provided, a perfect coupling may be made with the passenger equipment wherein the full or complete coupling members as shown in the drawings, are employed.

As shown in Figs. 5 and 7 of the drawings, at a point in spaced relation to the projecting arm 12 on the end of the coupler one side of the coupler body is cut away or open, the rectangular openings 15 being extended in the form of channels indicated at 20, and upon the upper and lower edges of this open side of the coupler body, the transversely projecting flanges 21 are formed. A finger 22 extends in spaced parallel relation to each of the channels 20, said finger at one of its ends merging into the coupler body, as indicated in Fig. 5. Upon the central portion of the coupler body, between the channels 20, a transversely projecting, longitudinally extending flange 23 is formed, said flange being disposed slightly below the upper channel 20 and integrally formed with the solid end of the coupler body below the upper opening 15 thereon. The base wall of this opening 15 is longitudinally channeled or recessed, as indicated at 24, to provide a vertical shoulder 25 at the inner end thereof.

26 designates a trip dog which is fulcrumed intermediate of its ends upon a transverse bolt 27 fixed in the coupler body. One end of this dog is angularly disposed as at 28, and upwardly extended through an opening 29 in the base wall of the rectangular opening 15 contiguous to the shoulder 25. The other end of the trip dog is also upwardly curved, as at 30, and is movable through an opening 31 formed in the base wall of channel 20. The upper longitudinally extending finger 22 has a longitudinal groove or channel 32 formed in the inner face thereof at its lower edge, said groove terminating in spaced relation to the outer extremity of the finger.

To the upwardly projecting arm of the pivoted triangular-shaped member 9, one end of a lever 33 is connected by means of the pivot bolt 34. The upper face of the arm or extension 12 of the coupling member is cut away or longitudinally recessed to form a continuation of the upper rectangular opening 15 in the coupler body. The base wall of this recess is inclined, as at 35, and upon the same the lever 33 normally rests. The free end of this lever, extending into the opening 15 is curved as at 36, and its extremity slightly bent upwardly. This curved end of the lever normally extends to a point slightly in advance of the vertical shoulder 25.

To the end of the pipe section 17 for the air brakes, a coupling head 37 is connected, said head being of substantially L-shaped form in cross-section, as shown in Fig. 8, the leg or extension 38 on said head projecting longitudinally from the end of the pipe 17 and having an outlet port 39 in its inner side wall in which a gasket, indicated at 40, is fitted or mounted in any approved manner. To the outer side wall of this coupling head, which is in opposed relation to the upper longitudinal finger 22, one end of a longitudinally curved or bowed leaf spring 41 is fixed, the other end of said spring sliding in a groove or channel 42 in the wall of the coupling head when the spring is flexed. The longitudinally projecting portion 38 of the coupling head is provided on the upper and lower edges of its face with the projecting flanges or curved ribs 43 which merge into reversely curved grooves or channels 44 designed to receive the flanges 43 of an opposed coupling head, as clearly shown in Fig. 4. Upon the train line pipe section 17, a coil spring 45 is arranged and bears at one of its ends against the head 37 and at its other end against the coupler body. This spring normally acts to force the head 37 outwardly toward the extremity of the finger 22 and engage the bowed leaf spring 41 in a cavity or recess 46 provided in the inner face of said finger. In Fig. 10 of the drawings, I have shown a single type of coupling head for application to the pipe section 17, while in Fig. 11, I have illustrated a double type of coupling head to which the service pipes 18 and 19 are adapted to be connected for use in connection with passenger equipment. It will be understood that each of the pipes 17, 18 and 19 is connected by a short length of hose or flexible tubing such as that indicated at 47, to the train line pipes which are suitably arranged beneath the car body. It is also understood, of course, that these train line pipes are equipped with suitable valves and operating means therefor.

In the operation of my improved air brake coupler, when the opposed coupling members are brought together, the fingers 22 on one of the coupling members move into the outer ends of the respective channels 20 in the opposed member. The upper finger 22 of each coupling member will project over the flange 23 on the other coupling member and the groove or channel 32 in the lower edge of this finger will accommodate the upwardly projecting end 30 of the trip dog 26. As the coupling members are forced together, the heads 37 on the pipe sections first contact with each other, the end of one coupling head striking the inner end of the other coupling head and forcing the same inwardly against the action of the springs 45. The leaf spring 41 of the coupling head will thus be forced out of the cavity 46 in the arm of the finger 22 and said spring will be placed under tension and act to force the coupling head transversely and into interlocking engagement with the other coupling head which is being forced in an opposite direction by its spring 41.

Thus, the gaskets 40 of the coupling heads are tightly engaged with each other so that leakage of the fluid in its passage through the ports 39 of the connected heads, is entirely obviated. The ribs or flanges 43 of the coupling heads hold the opposed longitudinally projecting portion thereof in spaced relation until the end of said portions on one head abuts squarely against the inner end of the other head so that the springs 41 will then act upon the heads and cause the gaskets 40 to properly contact with each other, the ribs 43 of one coupling head seating in the grooves 44 on the other head. The coupling members may continue their relative longitudinal movement in opposite directions with respect to the connected coupling heads until the extremity of the upper finger 22 of each coupling member engages the upwardly curved end 36 of the lever 33 and forces the same outwardly through the opening 15 until the end of said lever drops behind the shoulder 25, as indicated in dotted lines in Figs. 3 and 4 of the drawings. In this movement of the lever 33, it will be understood that the triangular-shape block 9 is raised upon the pivot pin 10, said block in turn, being connected to the arm 12 of the coupling member, elevating said member as shown in dotted lines in Fig. 1. The coupling member is normally supported in a pendant position by means of chains 48 attached at one of their ends to the coupling member adjacent opposite sides thereof, and at their other ends to the car body. When the coupling member is lifted in the manner above explained, these chains are slackened. Thus, each coupling member will then be supported in its raised position by the fingers 22 of the other coupling member. It will, therefore, be apparent that the coupling members may freely swing both horizontally and vertically in the swaying movement of the coaches or cars, and the coupling heads 37 will not become disconnected. As the coupling members are not connected in any way to the draw bars of the cars, it will be seen that the connection between the train line pipe sections will not be disturbed if one of the draw bars should pull out, as frequently happens. The coupling of the train line pipes can be very easily and quickly effected, and when connected, the back pressure upon all kinds of cars and locomotives will never exceed twenty-five pounds.

From the foregoing description, taken in connection with the accompanying drawings, the construction, manner of operation and several advantages of my invention will be clearly and fully understood. The device is comparatively simple, positive and reliable in its operation, and may be installed upon freight cars or passenger coaches at a minimum expense.

While I have shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. In an air brake coupler, coupling members and flexible means to suspend said members from the ends of the car, and means connected to each of the coupling members and actuated by an opposed coupling member to elevate said members whereby they mutually support each other independently of the suspension means.

2. In an air brake coupler, coupling members, flexible elements for suspending said members from the cars, a vertically movable element to which each coupling member is connected, said coupling members each having a finger for interfitting engagement with the other coupling member, and means connected to each of the vertically movable elements adapted to be engaged by one finger on the opposed coupling member whereby the coupling members are elevated, and the fingers of said coupling members each sustaining the other coupling member in its elevated position independently of the flexible suspension members.

3. In an air brake coupler, coupling members, chains suspending said members from the cars, a horizontally swinging block mounted upon each car, a vertically movable member mounted therein to which the coupling member on the car is connected, and an operating element connected to said vertically movable member adapted to be engaged by a part on the opposed coupling member when the members are connected, whereby said coupling members are elevated and caused to mutually sustain each other in such elevated positions independently of the suspension chains.

4. In an air brake coupler, coupling members, chains for suspending said members from the cars, a vertically and horizontally movable member mounted beneath each car to which the coupling member thereon is connected, and an operating lever connected to said movable member and adapted to be engaged by a part on an opposed coupling member when the members are connected whereby said coupling members are elevated and caused to mutually sustain each other in such elevated positions independently of the suspending chains.

5. In an air brake coupler, coupling members, chains for suspending said members from the cars, a vertically and horizontally movable member mounted beneath each car to which the coupling member thereon is connected, and an operating lever connected to said movable member and adapted to be engaged by a part of an opposed coupling member when the members are connected whereby said coupling members are elevated and caused to mutually sustain each other in such elevated positions independently of the suspending chains, each of said coupling members being provided with additional means for engagement by the respective levers whereby the lever is held against reverse movement to its normal position.

6. In an air brake coupler, coupling members, chains for suspending said members from the cars, a vertically and horizontally movable member mounted beneath each car to which the coupling member thereon is connected, and an operating lever connected to said movable member and adapted to be engaged by a part of an opposed coupling member when the members are connected, whereby said coupling members are elevated and caused to mutually sustain each other in such elevated positions independently of the suspending chains, each of said coupling members being provided with a shoulder against which the ends of the respective levers are adapted to abut when moved by the other coupling member, whereby the lever is held against reverse movement to its normal position.

7. In an air brake coupler, coupling members, chains for suspending said members from the cars, a vertically and horizontally movable member mounted beneath each car to which the coupling member thereon is connected, an operating lever connected to said movable member and adapted to be engaged by a part of an opposed coupling member when the members are connected, whereby said coupling members are elevated and caused to mutually sustain each other in such elevated positions independently of the suspending chains, each of said coupling members being provided with a shoulder against which the ends of the respective levers are adapted to abut when moved by the other coupling member, whereby the lever is held against reverse movement to its normal position, and means actuated by a part of each of the respective coupling members when the same are uncoupled to release said levers from engagement with said shoulders.

8. In an air brake coupler, coupling members, chains suspending said members beneath the cars, said coupling members having complementary fingers and channels for interfitting engagement, means connected to the respective coupling members and permitting of their vertical and lateral swinging movement, and means actuated by the respective members when the same are coupled together to lift said members and slacken the suspending chains so that the fingers will mutually act to sustain the coupling members in their elevated positions.

9. In an air brake coupler, coupling members, chains suspending said members beneath the cars, said members having complementary fingers and channels for interfitting engagement, a block mounted beneath each car for horizontal pivotal movement, a vertically movable member pivoted in the block, the coupling member on the car being pivotally connected to said vertically movable member, a lever pivotally connected to said member, the respective levers being adapted for engagement by one of the fingers on each coupling member when the coupling members are connected to actuate the vertically movable element and lift the coupling members to slacken the suspending chains, each of said coupling members being provided with means with which the extremity of the lever is adapted to engage to prevent the reverse movement of the lever to its normal position, and a movable element mounted on each coupling member and actuated by the coupling finger when the members are disconnected to coöperatively engage said lever and disengage the same from the means on the coupling member, whereby said members will return to their normal positions.

10. In an air brake coupler, coupling members, chains suspending said members beneath the cars, said members having complementary fingers and channels for interfitting engagement, a block mounted beneath each car for horizontal pivotal movement, a vertically movable member pivoted in the block, the coupling member on the car being pivotally connected to said vertically movable member, a lever pivotally connected to said member, the respective levers being adapted for engagement by one of the fingers on each coupling member when the coupling members are connected to actuate the vertically movable element and lift the coupling members to slacken the suspending chains, each of said coupling members being provided with means with which the extremity of the lever is adapted to engage to prevent the reverse movement of the lever to its normal position, and a pivotally mounted dog on each coupling member adapted to be engaged and actuated by the finger when said members are disconnected, whereby the dog is operatively engaged with the lever and said lever moved to permit the lever and the coupling member to return to their normal relative positions.

11. In an air brake coupler, coupling members, chains suspending said members beneath the cars, said members having complementary fingers and channels for interfitting engagement, a block mounted beneath each car for horizontal pivotal movement, a vertically movable member pivoted in the block, the coupling member on the car being pivotally connected to said vertically movable member, a lever pivotally connected to said member, the respective levers being adapted for engagement by one of the fingers on each coupling member when the coupling members are connected to actuate the vertically movable element and lift the coupling members to slacken the suspending chains, each of said coupling members being provided with means with which the extremity of the lever is adapted to engage to prevent the reverse movement of the lever to its normal position, a dog fulcrumed intermediate of its ends and having its extremities angularly disposed, one extremity of the dog being operatively engaged by the finger of the other coupling member when said members are uncoupled to actuate the dog and engage the other end thereof with said lever and move the lever out of engagement with the means on the coupling member to permit the lever and coupling member to return to their normal relative positions.

12. In an air brake coupler, coupling members, chains suspending said members beneath the cars, a vertically movable member mounted beneath the car to which the coupling member thereon is connected, said coupling members having complementary fingers and channels for interfitting engagement, a lever connected at one end to said vertically movable member, the other end of said lever being engaged by one of the fingers of the opposed coupling member when the members are connected and moved to lift the coupling member and slacken the suspending chain, said coupling member having a shoulder with which the latter end of the lever is adapted to engage, a trip dog fulcrumed intermediate of its ends upon each coupling member and having angularly disposed extremities, the lever-engaging fingers of the coupling members being grooved to accommodate one of the extremities of the respective dogs when the members are connected, said ends of the dogs being operatively engaged by the fingers when the members are uncoupled to actuate the dogs and engage the other ends thereof with the respective levers and disengage the latter from the shoulders on the coupling members, whereby said members are permitted to return to their normal positions.

13. In an air brake coupling, the combination with the coupling members having complementary fingers and channels for interfitting engagement, of air pipe sections carried by the respective coupling members and each having a coupling head, springs arranged upon the pipe sections to cushion the impact of the heads when said members are coupled together, said heads being provided with interlocking means, and means on the respective heads coöperating with one of the fingers of the respective coupling members, whereby an air-tight connection between the heads is effected when the members are coupled together.

14. In an air brake coupler, the combination with the coupling members having complementary fingers and channels for interfitting engagement, of air pipe sections carried by the respective coupling members, a coupling head on each of said pipes, springs arranged upon the pipes to cushion the impact of said heads when the members are coupled together, and a bowed leaf spring fixed to one side of each coupling head and coöperatively engaged with one of the fingers of the respective coupling members to force said heads toward each other and effect an air-tight connection between the same.

15. In an air brake coupler, the combination with the coupling members having complementary fingers and channels for interfitting engagement, of air pipe sections carried by the respective coupling members, a coupling head on each pipe section, springs on said pipe sections to cushion the impact of the heads when the members are coupled together, each coupling head having a port and a gasket seated therein, a leaf spring fixed at one end to each of the coupling heads and having sliding bearing engagement upon the head at its other end, one of the fingers of the respective coupling members being provided with a cavity to receive said spring when the coupling head is in its normal position, said springs being forced out of the recesses in the respective fingers when the members are coupled together and placed under tension to project the heads toward each other and effect an air-tight engagement between the ports of the coupling heads.

16. In an air brake coupler, coupling members and flexible means to suspend said members from the ends of the car, and means positively actuated by the respective coupling members when the same are connected together to elevate the other coupling member and sustain said members in such elevated positions independently of the suspension means.

17. In an air brake coupler, coupling members and means for suspending said members from the ends of the cars, vertically movable elements connected to the respective coupling members, and means operatively connected to each of said elements and actuated by the other coupling member when said members are connected together to elevate said members from their normal positions and sustain the coupling members in such elevated positions independently of the suspension means.

18. In an air brake coupler, coupling members, means connected to each of said members and suspending the same from the car, and means connected to the rear end of each coupling member and automatically actuated by the other coupling member when said members are connected, whereby the coupling members are elevated and sustained in such elevated positions independently of the suspending means.

19. In an air brake coupler, coupling members, flexible elements connected to each coupling member intermediate of its ends and suspending the same from a car, a pivoted element mounted beneath the car and operatively connected to the rear end of the coupling member, and means connected to said element and engaged and actuated by the opposed coupling member when the members are connected to each other to elevate the coupling members and sustain the same in such elevated positions independently of the suspension means.

20. In an air brake coupler, coupling members, chains suspending said members intermediate of their ends from the cars, a vertically movable element mounted beneath the car and operatively connected to the coupling member, and a lever connected to said element and engaged and actuated by the opposed coupling member when the members are connected together and operating said vertically movable elements to elevate the coupling members from their normal positions and slacken the suspending chains.

21. In an air brake coupler, coupling members, flexible elements suspending said members from the cars, and means mounted beneath each car and operatively connected to the coupling member, said means including an element to be engaged and actuated by the other coupling member when said members are connected together to operate said last named means and elevate the coupling members from their normal positions and slacken the suspending elements.

22. In an air brake coupler, coupling members, flexible elements suspending said members from the cars, and means mounted beneath each of the cars and operatively connected to the coupling member, said means including a lever adapted to be engaged and actuated by the opposed coupling member to operate said means and elevate the coupling members from their normal positions, each of said coupling members having a stop shoulder engaged by the end of said lever after the same has been actuated, whereby the coupling members are sustained in their elevated positions independently of the suspension elements.

23. In an air brake coupler, the combination with the coupling members having complementary fingers and channels for interlocking engagement, of air pipe sections carried by the respective coupling members and each having a coupling head, means on the respective heads coöperating with the adjacent finger of the coupling member and acting in the longitudinal movement of said heads with respect to the coupling fingers to force the heads laterally and effect an air-tight interlocking connection between the same.

24. In an air brake coupler, the combination with the coupling members having complementary fingers and channels for interfitting engagement, of air pipe sections carried by the respective coupling members and each having a coupling head, means on each of the coupling heads coöperatively engaged with means on the respective fingers to hold the heads against casual longitudinal movement from their normal positions, said means on the coupling heads acting against the opposed faces of the coupling fingers upon a longitudinal movement of the heads to exert a lateral pressure upon the coupling heads and effect an air-tight interlocking connection between the same, and means operating to return the coupling heads to their normal positions with respect to the coupling fingers.

In testimony whereof I hereunto affix my signature in the presence of two witnesses.

WARREN C. BENJAMIN.

Witnesses.
VERA COOK,
GEO. S. ROBINSON.

Copies of this patent may be obtained for five cents each, by addressing the "Commissioner of Patents, Washington, D. C."